United States Patent
Doering et al.

(10) Patent No.: US 9,606,616 B2
(45) Date of Patent: Mar. 28, 2017

(54) DEVICE AND METHOD FOR RECONFIGURABLE POWER CONVERSION

(71) Applicant: International Business Machines Corporation, Armonk, NY (US)

(72) Inventors: Andreas C. Doering, Zufikon (CH); Rihards Dziedatajs, Kilchberg (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 14/656,813

(22) Filed: Mar. 13, 2015

(65) Prior Publication Data
US 2016/0266639 A1 Sep. 15, 2016

(51) Int. Cl.
G06F 1/26 (2006.01)
G06F 1/32 (2006.01)

(52) U.S. Cl.
CPC .............. *G06F 1/3296* (2013.01); *G06F 1/26* (2013.01)

(58) Field of Classification Search
None
See application file for complete search history.

(56) References Cited

U.S. PATENT DOCUMENTS

| | | | |
|---|---|---|---|
| 6,771,052 B2 | 8/2004 | Ostojic | |
| 7,288,951 B1* | 10/2007 | Bailey | G01R 31/2856 324/750.05 |
| 7,844,840 B2 | 11/2010 | McShane | |
| 8,736,102 B1 | 5/2014 | Gao | |
| 2012/0329509 A1* | 12/2012 | Ravichandran | H04W 52/0274 455/522 |
| 2015/0171631 A1* | 6/2015 | Duell | H02J 3/46 307/80 |

OTHER PUBLICATIONS

Andreas C. Doering et al.., unpublished U.S. Appl. No. 14/983,525, filed Dec. 29, 2015 "Device and Method for Reconfigurable Power Conversion" pp. 1-23 plus 4 sheets drawings.
List of IBM Patents or Patent Applications Treated as Related.

* cited by examiner

*Primary Examiner* — Paul Yanchus, III
(74) *Attorney, Agent, or Firm* — Daniel P. Morris; Otterstedt, Ellenbogen & Kammer, LLP (57) ABSTRACT

A device for reconfigurable power conversion includes a plurality of power-consuming modules adapted to receive a plurality of electrical voltages, and a power converter module including a plurality N of power stages, each of which includes a power output which is adapted to supply one of the plurality of electrical voltages and adapted to be coupled with at least one of the others of the power outputs off the power converter module. Also included is a backplane including a plurality of power rails, each of which is adapted to distribute one of the plurality of electrical voltages from the power converter module to the plurality of power-consuming modules. The power converter module further includes a programmable converter controller which is adapted to reversibly configure the plurality of power stages.

11 Claims, 4 Drawing Sheets

DEVICE AND METHOD FOR RECONFIGURABLE POWER CONVERSION

BACKGROUND

The present invention relates to a device for reconfigurable power conversion and to a method for operating a device for reconfigurable power conversion, for particular use in parallel computing.

The paradigm of parallel computing is nowadays based on large numbers of networked physical servers which are adapted to commission, execute and decommission virtual servers (or virtual machines) in parallel and independently of each other.

The supply of electrical power within such physical servers is usually based on DC voltage levels of 12V, 5V and the like, while modern silicon devices actually require a plurality of lower device voltages such as 3.3V or 2.5V for peripheral or network connectivity, 1.35V for main memory or 1.0V for main processors, for example. Conversion from supply voltage to the different device voltages is performed by a plurality of DC-DC power converters—one per device voltage—each of which being deployed close to the respective target device, i.e. at the "point of load". These power converters, which are also called buck converters, include at least a single power stage having a single inductor and a single power transistor, and the output voltage of a power stage may be configured by adapting the duty cycle of a pulse-width modulation (PWM) signal driving the power transistor.

If relatively high currents are required, such as 30 A at 1V, for example, a common measure is to couple several power stages at their power outputs to form so-called multi-phase converters. The term indicates that the several power stages need to be coordinated such that they take turns in providing the desired output voltage. Usually, multi-phase converters are controlled by a programmable converter controller to ensure configurability of output voltage and coordination of power stages, and thus eligible for a wide variety of applications.

In U.S. Pat. No. 6,771,052 B2, a multi-output DC-DC power supply is proposed which has programmable operating characteristics, such as voltage levels, turn-on and off sequences, mono-phase and multi-phase operation, voltage ramp-up and ramp-offs, tracking and protection mode thresholds and action-if-fault strategies. The power supply has a DC-DC converter having an output coupled to a plurality of buck converters. Each buck converter has an output and a control input where the voltage at the output of the buck converter is determined by a duty cycle of at least one pulse width modulated signal provided at the control input of that buck converter. A programmable device has outputs coupled to the control inputs of the buck converters. The programmable device generates the pulse width modulated signals at its outputs for controlling the buck converters to provide voltages corresponding to voltages programmed in the programmable device. The programmable device is programmable and reprogrammable to control the programmable operating characteristics of the power supply.

U.S. Pat. No. 7,844,840 B2 discloses a configurable power control system, which may include a control module and an enable/disable module coupled to a power rail (i.e. an internal power line) to enable and disable power to the power rail. The system can also include a sequencer module coupled to the first and a second power rail to sequence power to the power rail(s). The system can also include a fault detect module to detect system parameters. Additionally, the system can include a memory module to store user input and can store detected faults to be utilized by the control module and other modules to control interrelationships between the enable module, the sequencer module, the fault detect module, power in, and power provided via the power rails.

In U.S. Pat. No. 8,736,102 B1, a multifunctional power converter apparatus and a method are described. The apparatus includes an input power stage configured to receive a DC input voltage from a DC power source and convert the DC input voltage to an AC or DC output voltage. At least one electrical power conversion electronic circuit is connected to an output of the input power stage, a DC output circuit, an AC output circuit, and a controller configured to control the input power stage, the DC output circuit and the AC output circuit. The controller is configured to automatically control the power converter output voltage based on a preselected user input.

With the advent of multi-core processors and multi-processor paradigms, increasing compute power density has become a particular goal in parallel computing. This especially holds for physical server infrastructures based on Systems on a Chip (SoC) which integrate almost all digital devices of a common physical server motherboard, such as in the microserver concept described in R. P. Luijten and A. Doering, The DOME embedded 64 bit microserver demonstrator, in ICICDT, pages 203-206, 2013. It is evident that providing a dedicated set of "point of load" converters per SoC would contradict the goal of increasing compute power density. Moreover, depending on the capacities of market-available power converters, the potential deployment of dedicated power converters in partial utilization is a waste of resources.

Accordingly, it is an aspect of the present invention to improve the power conversion within physical servers.

SUMMARY

According to a first aspect, a device for reconfigurable power conversion is proposed. The device comprises a plurality of power-consuming modules being adapted to receive a plurality of electrical voltages, a power converter module including a plurality N of power stages, wherein each of the plurality of power stages includes a power output which is adapted to supply one of the plurality of electrical voltages and adapted to be coupled with at least one of the others of the power outputs off the power converter module, and a backplane including a plurality of power rails, wherein each of the plurality of power rails is adapted to distribute one of the plurality of electrical voltages from the power converter module to the plurality of power-consuming modules. The power converter module further includes a programmable converter controller which is adapted to reversibly configure those of the plurality of power stages having coupled power outputs to supply a common electrical voltage of the plurality of electrical voltages at the coupled power outputs and to reversibly configure each of the plurality of power stages having un-coupled power outputs to supply one of the plurality of electrical voltages at its un-coupled power output.

In an embodiment, the backplane includes a plurality of electrical connectors. Each of the plurality of electrical connectors is adapted to provide a plurality of electrical connections to the plurality of power rails.

In a further embodiment, the power converter module is connected to the backplane via one of the plurality of electrical connectors.

In a further embodiment, each of the plurality of power-consuming modules is connected to the backplane via one of the others of the plurality of electrical connectors.

In a further embodiment, the power output of each of the plurality of power stages is connected to one of the plurality of power rails.

In a further embodiment, each of the plurality of power-consuming modules is connected to at least one of the plurality of power rails.

In a further embodiment, a set of M power outputs of the plurality N of the power outputs are coupled within the backplane, with $2<M\leq N$, and those of the plurality of power rails are coupled to which the set of M power outputs are connected.

In a further embodiment, the set of M power outputs of the plurality N of the power outputs are coupled within at least one of the plurality of electrical connectors, with $2<M\leq N$, and those of the plurality of electrical connections are coupled to which the set of M power outputs are connected.

In a further embodiment, the set of M power outputs of the plurality N of the power outputs is coupled within at least one of the plurality of power-consuming modules, and endpoints of those of the plurality of electrical connections are coupled to which the set of M power outputs is connected.

In a further embodiment, the programmable converter controller is adapted to reversibly configure those of the plurality of power stages having coupled power outputs to supply the common electrical voltage of the plurality of electrical voltages at the coupled power outputs based on a first information identifying those power stages having coupled power outputs.

In a further embodiment, the programmable converter controller is adapted to reversibly configure those of the plurality of power stages having coupled power outputs to intermittently supply the common electrical voltage of the plurality of electrical voltages at the coupled power outputs based on the first information identifying those power stages having coupled power outputs.

In a further embodiment, the programmable converter controller is adapted to reversibly configure each of the plurality of power stages having un-coupled power outputs to supply one of the plurality of electrical voltages at its un-coupled power output, based on a second information identifying those power stages having un-coupled power outputs.

In a further embodiment, the programmable converter controller is further adapted to control a plurality of electrical currents at the power outputs of the plurality N of power stages based on measured values of the electrical voltages at the power outputs of the plurality of power stages.

Any embodiment of the first aspect may be combined with any embodiment of the first aspect to obtain another embodiment of the first aspect.

According to a second aspect, a method for operating a device for reconfigurable power conversion is proposed, the device including a plurality of power-consuming modules being adapted to receive a plurality of electrical voltages, a power converter module including a plurality N of power stages, wherein each of the plurality of power stages includes a power output which is adapted to supply one of the plurality of electrical voltages and adapted to be coupled with at least one of the others of the power outputs off the power converter module, and a backplane including a plurality of power rails, wherein each of the plurality of power rails is adapted to distribute one of the plurality of electrical voltages from the power converter module to the plurality of power-consuming modules. The method comprises the step of reversibly configuring those of the plurality of power stages having coupled power outputs to supply a common electrical voltage of the plurality of electrical voltages at the coupled power outputs, and each of the plurality of power stages having un-coupled power outputs to supply one of the plurality of electrical voltages at its un-coupled power output.

According to a third aspect, the invention relates to a computer program comprising a program code for executing the method of the second aspect for operating a device for reconfigurable power conversion when run on at least one computer.

In the following, exemplary embodiments of the present invention are described with reference to the enclosed figures.

DETAILED DESCRIPTION

Figure 1:
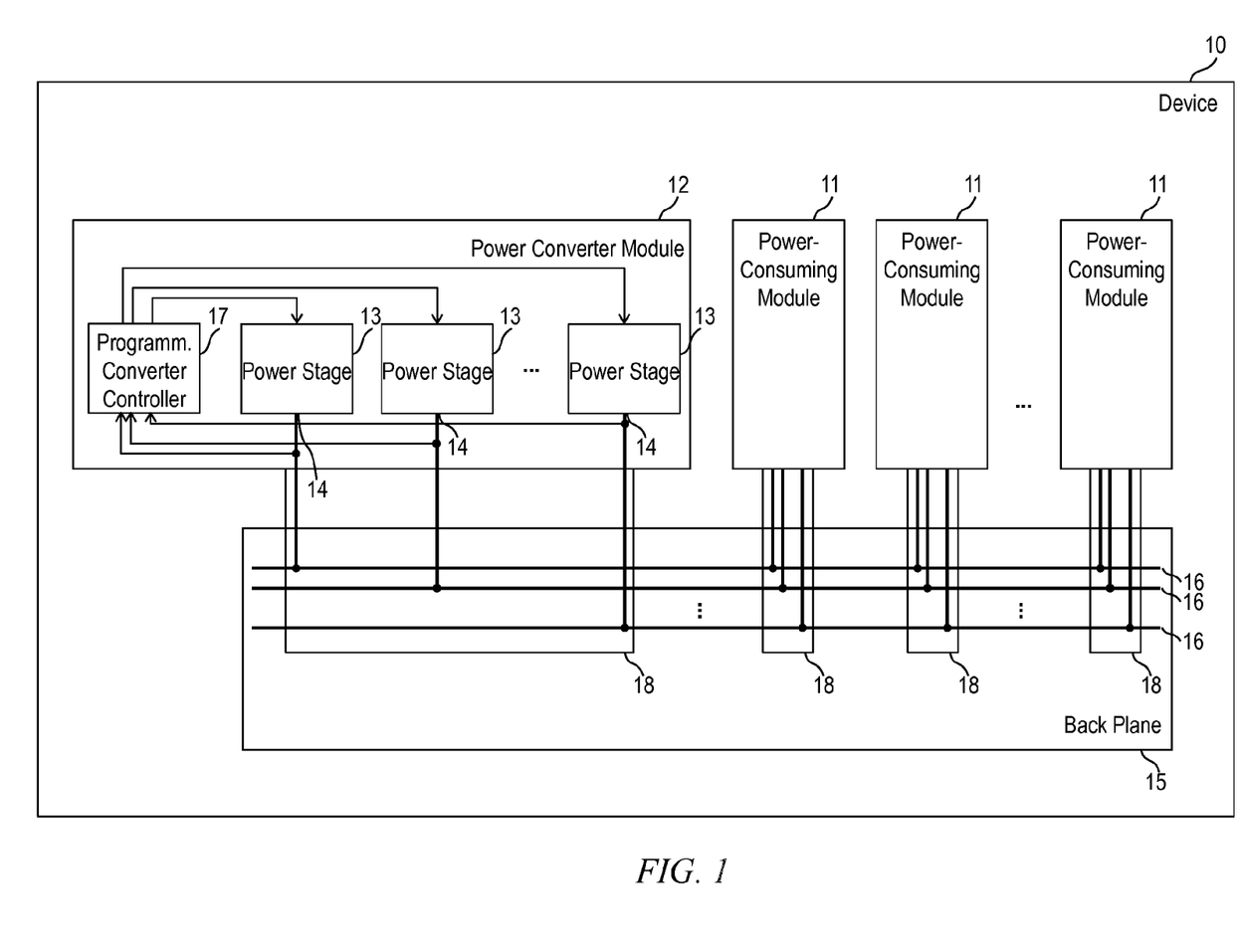
FIG. 1 shows a schematic block diagram of an embodiment of a device for reconfigurable power conversion.

FIG. 1 shows a schematic block diagram of an embodiment of a device 10 for reconfigurable power conversion.

On the right-hand side of FIG. 1, a plurality of power-consuming modules 11 is illustrated which is adapted to receive a plurality of electrical voltages.

On the left-hand side, a power converter module 12 is depicted including a plurality N of power stages 13. Each of the plurality of power stages 13 includes a power output 14 which is adapted to supply one of the plurality of electrical voltages to be received by the plurality of power-consuming modules 11. In particular, the power outputs 14 are adapted to be coupled with at least one of the others of the power outputs 14 off the power converter module 12.

At the bottom of FIG. 1, a backplane 15 is shown including a plurality of power rails 16. Particularly, each of the plurality of power rails 16 is adapted to distribute one of the plurality of electrical voltages from the power converter module 12 to the plurality of power-consuming modules 11. For example, different types of power-consuming modules 11 may receive different subsets of the plurality of electrical voltages.

As additionally shown on the left-hand side of FIG. 1, the power converter module 12 further includes a programmable converter controller 17 which is adapted to reversibly configure those of the plurality of power stages 13 having coupled power outputs 14 to supply a common electrical voltage of the plurality of electrical voltages at the coupled power outputs 14 and to reversibly configure each of the plurality of power stages 13 having un-coupled power outputs 14 to supply one of the plurality of electrical voltages at its un-coupled power output 14.

Advantageously, off-module coupling of power outputs 14 provides a choice of different points of coupling within the device 10. For example, coupling of power outputs 14 may be carried out within the backplane 15, within at least one of the plurality of electrical connectors 18 and/or within at least one of the plurality of power-consuming modules 11. Preferably, several such coupling variants may be configured or reconfigured via exchanging the backplane 15, the electrical connectors 18 and/or the power-consuming modules 11 deployed.

Advantageously, the combination of off-module coupling of the power outputs 14 and reconfigurability of the power stages 13 enables deployment of the same power converter module 12 for different power consumption scenarios which differ in the number of and/or the magnitude of the electrical voltages received by the plurality of power consuming modules 11.

For example, the device 10 may be a microserver including a plurality of power-consuming modules 11, each of which requiring a plurality of electrical voltages to be received for proper operation.

Reconfigurable power conversion particularly denotes a kind of power conversion in which the plurality of electrical voltages to be received may be reconfigured via a substitution of parts and/or via reprogramming of the power stages 13. In other words, the substitution of parts such as backplane 15, electrical connectors 18 and/or power-consuming modules 11 may vary an electrical coupling of the power outputs 14, and the reprogramming of the plurality of power stages 13 may realize that the supplied plurality of electrical voltages is consistent with the given electrical coupling of the power outputs 14 as well as with the plurality of electrical voltages to be received.

According to some implementations, different types of power-consuming modules 11 may be deployed with different subsets of the plurality of electrical voltages to be received. Examples comprise compute modules, storage input/output modules or network input/output modules.

Particularly, a power stage 13, also known as buck converter, may convert a higher electrical voltage (e.g. 5V or 12V) provided by a power supply to a lower electrical voltage (e.g. 1V for CPUs or 1.35V for DRAMs) received by one or more power-consuming modules 11. Multiphase buck converters in particular may include a plurality of power stages 13 which are placed in parallel between a power supply providing the higher electrical voltage and one or more power-consuming modules 11 requiring the lower electrical voltage.

In particular, a backplane 15 including a plurality of power rails 16 which may extend in parallel may also be called a power bus. Given that each of the plurality of power rails 16 is adapted to distribute one of the plurality of electrical voltages from the power converter module 12 to the plurality of power-consuming modules 11, different types of backplanes 15 may be put to use depending on the electrical voltages and/or currents required by a deployed plurality of power-consuming modules 11.

Particularly, a programmable converter controller 17 is a programmable device which, upon programming, configures or reconfigures the plurality of power stages 13 hosted by a power conversion module 12 to provide a required plurality of electrical voltages to be received.

In particular, the programmable converter controller 17 is adapted to control a plurality of electrical currents at the power outputs 14 of the plurality of power stages 13 based on measured values of the electrical voltages at the power outputs 14 of the plurality of power stages 13.

Advantageously, measuring the values of the electrical voltages at the power outputs 14 of the plurality of power stages 13 provides instantaneous values which may be used to control the said electrical voltages.

In particular, power consumption within device 10 may change whenever the compute load of at least one of the plurality of power-consuming modules 11 changes. Thus, a device 10 in which a plurality of power-consuming modules 11 receives a plurality of electrical voltages, those received electrical voltages may be subject to variations. In some implementations, the plurality of power stages 13 may therefore be controlled to keep the instantaneous values of the plurality of the received electrical voltages constant.

The programmable converter controller 17 may be implemented in hardware and/or in software. If said controller 17 is implemented in hardware, it may be embodied as a device, e.g. as a computer or as a processor or as a part of a system, e.g. a device 10. If said controller 17 is implemented in software it may be embodied as a computer program product, as a function, as a routine, as a program code or as an executable object.

In FIG. 1, a plurality of electrical connectors 18 is depicted, each of which is adapted to provide a plurality of electrical connections from the modules 11, 12 to the plurality of power rails 16.

Advantageously, the introduction of electrical connectors 18 enables unifying the access of the modules 11, 12 to the plurality of power rails 16. In particular, if the pinout of the plurality of electrical connectors 18 is unified, then the modules 11, 12 may be plugged into any of the plurality of electrical connectors 18 in order to realize the supply of the plurality of electrical voltages via the plurality of power rails 16.

Advantageously, the electrical connectors 18 may be formed such that they additionally provide a mechanical support for the modules 11, 12 which are plugged into them.

From FIG. 1, it is apparent that the power converter module 12 is connected to the backplane 15 via one of the plurality of electrical connectors 18. In more detail, the power output 14 of each of the plurality of power stages 13 is connected to one of the plurality of power rails 16.

Thus, the power converter module 12 occupies one of the plurality of electrical connectors 18, and each of the plurality of power stages 13 of the power converter module 12 may be operated separately, if needed. In particular, any coupling between the power stages 13 is subject to the type of backplane 15, electrical connectors 18 and/or power-consuming modules 11 deployed.

Likewise, FIG. 1 reveals that each of the plurality of power-consuming modules 11 is connected to the backplane 15 via one of the others of the plurality of electrical connectors 18. Moreover, as the power-consuming modules 11 usually receive more than a single electrical voltage, each of the plurality of power-consuming modules 11 may be connected to one or more of the plurality of power rails 16.

Hence, each of the plurality of power-consuming modules 11 also occupies one of the plurality of electrical connectors 18, and potentially makes use of up to all electrical connections of the one of the plurality of electrical connectors 18.

Figure 2A:
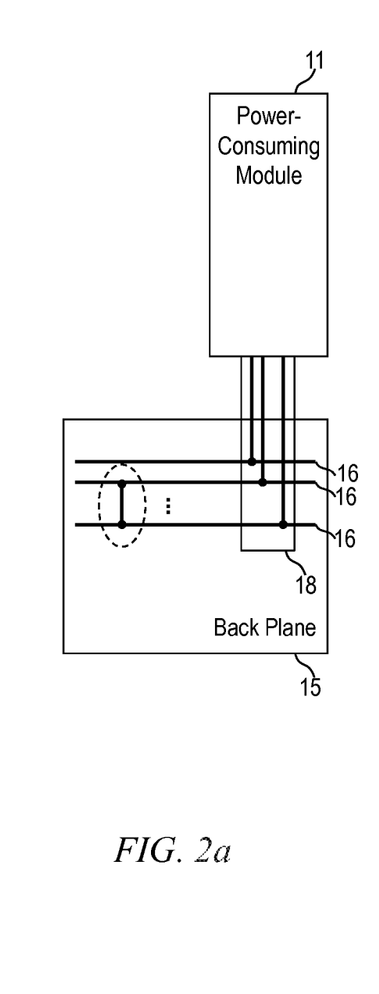
FIGS. 2a, 2b and 2c show details of the embodiment of FIG. 1 for different cases of coupled power outputs.
Figure 2B:
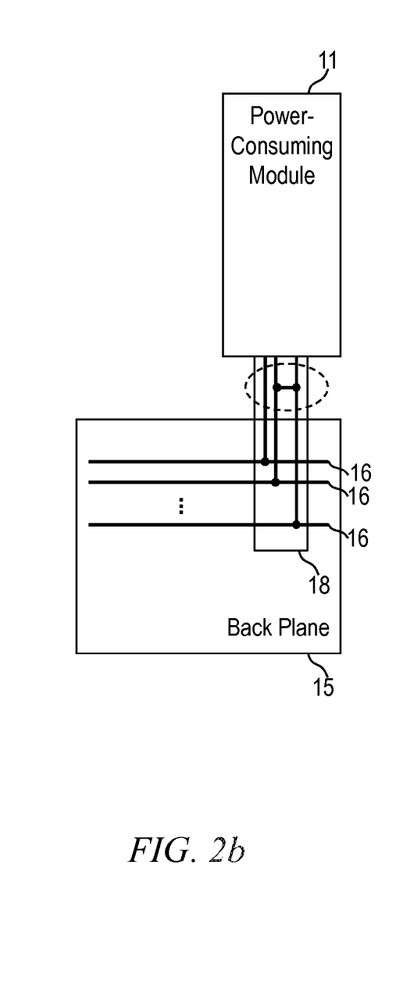
Figure 2C:
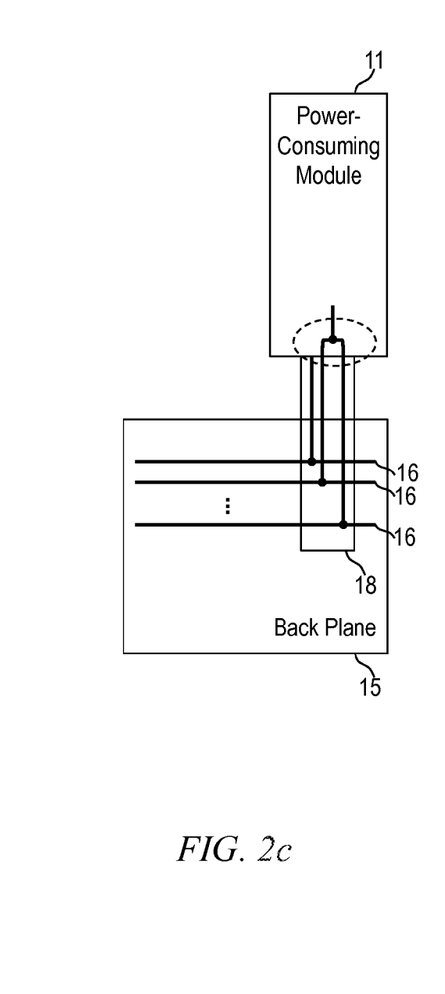

FIGS. 2a, 2b and 2c highlight details of the embodiment of FIG. 1 for different cases of coupled power outputs 14. In particular, the three different options given may be combined, too.

In this context, FIG. 2a depicts a first option wherein two of the three depicted power rails 16 are coupled within the backplane 15 in order to couple those two of the power outputs 14 to which the coupled power rails 16 are electrically connected.

Further, FIG. 2b shows a second option wherein two of the three electrical connections of the depicted electrical connector 18 are coupled in order to couple those two of the power outputs 14 to which the coupled electrical connections are electrically connected.

Furthermore, FIG. 2c shows a third option wherein two of the three electrical connections of the depicted electrical connector 18 are coupled at their endpoints within the depicted power-consuming module 11 in order to couple those two of the power outputs 14 to which the coupled electrical connections are electrically connected.

Advantageously, coupling of power stages 13 at their power outputs 14 provides higher currents or, when current is kept constant, reduces output inductance (i.e. inductor size) of the coupled power stages 13. Furthermore, coupling of power stages 13 at their power outputs 14 off the power converter module 12 enables receiving electrical voltages at higher currents on a need basis.

Based on a first information identifying those power stages 13 having coupled power outputs 14, the programmable converter controller 17 depicted in FIG. 1 is adapted to configure those of the plurality of power stages 13 having coupled power outputs 14 to supply the common electrical voltage of the plurality of electrical voltages. Further, the programmable converter controller 17 is adapted to reconfigure the plurality of power stages 13 if the first information should change.

In particular, if different electrical voltages are supplied at coupled power outputs 14, a disaster may result. Hence the programmable converter controller 17 needs to be provided with the first information identifying those power stages 13 having coupled power outputs 14. For example, this first information may be provided by appropriate programming of the controller 17.

Based on this first information, the programmable converter controller 17 may also configure and reconfigure those of the plurality of power stages 13 having coupled power outputs 14 to intermittently supply the common electrical voltage of the plurality of electrical voltages at the coupled power outputs 14.

Preferably, power stages 13 having coupled power outputs 14 are to be operated intermittently, such that the power stages 13 take turns in supplying the common electrical voltage at the coupled power outputs 14. In particular, the power stages 13 supply the common electrical voltage at equally spaced periodic intervals.

Based on a second information identifying those power stages 13 having un-coupled power outputs 14, the programmable converter controller 17 may configure and reconfigure each of those power stages 13 to supply one of the plurality of electrical voltages at its un-coupled power output 14.

In particular, while a subset of the plurality of power stages 13 may be coupled electrically and configured to supply the common electrical voltage to the plurality of the power-consuming modules 11, those of the plurality of power stages 13 having un-coupled power outputs 14 may still be operated independently of one another. For example, some of the plurality of power stages 13 may be coupled to supply high currents at their common electrical voltage, while others may supply significantly less current at different electrical voltage levels which are both required and received by the power-consuming modules 11, too.

Figure 3:
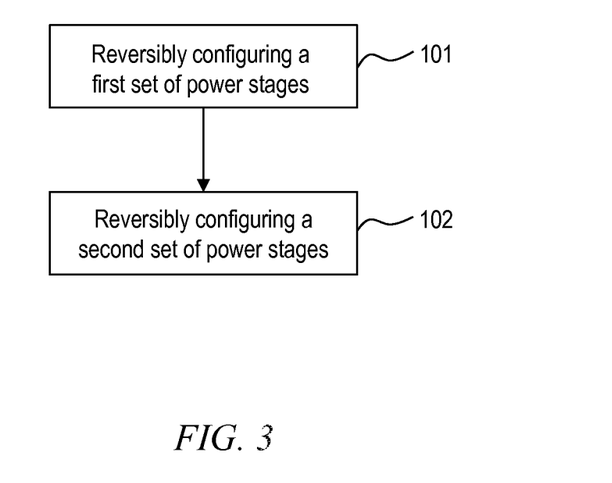
FIG. 3 shows a schematic block diagram of an embodiment of a method for operating a device for reconfigurable power conversion.

FIG. 3 shows a schematic block diagram of an embodiment of a method for operating a device 10 for reconfigurable power conversion.

The device 10 includes a plurality of power-consuming modules 11 being adapted to receive a plurality of electrical voltages, a power converter module 12 including a plurality of power stages 13, wherein each of the plurality of power stages 13 includes a power output 14 which is adapted to supply one of the plurality of electrical voltages and adapted to be coupled with at least one of the others of the power outputs 14 off the power converter module 12, and a backplane 15 including a plurality of power rails 16, wherein each of the plurality of power rails 16 is adapted to distribute one of the plurality of electrical voltages from the power converter module 12 to the plurality of power-consuming modules 11.

As shown in FIG. 3, the method comprises two steps 101, 102, which may be performed one after another in arbitrary order, or in parallel.

In step 101, which is based on a first information identifying those power stages 13 having coupled power outputs 14, those of the plurality of power stages 13 identified by said first information are reversibly configured to supply a common electrical voltage of the plurality of electrical voltages at the coupled power outputs 14.

In step 102, which is based on a second information identifying those power stages 13 having un-coupled power outputs 14, each of the plurality of power stages 13 identified by said second information is configured to supply one of the plurality of electrical voltages at its un-coupled power output 14.

Figure 4:
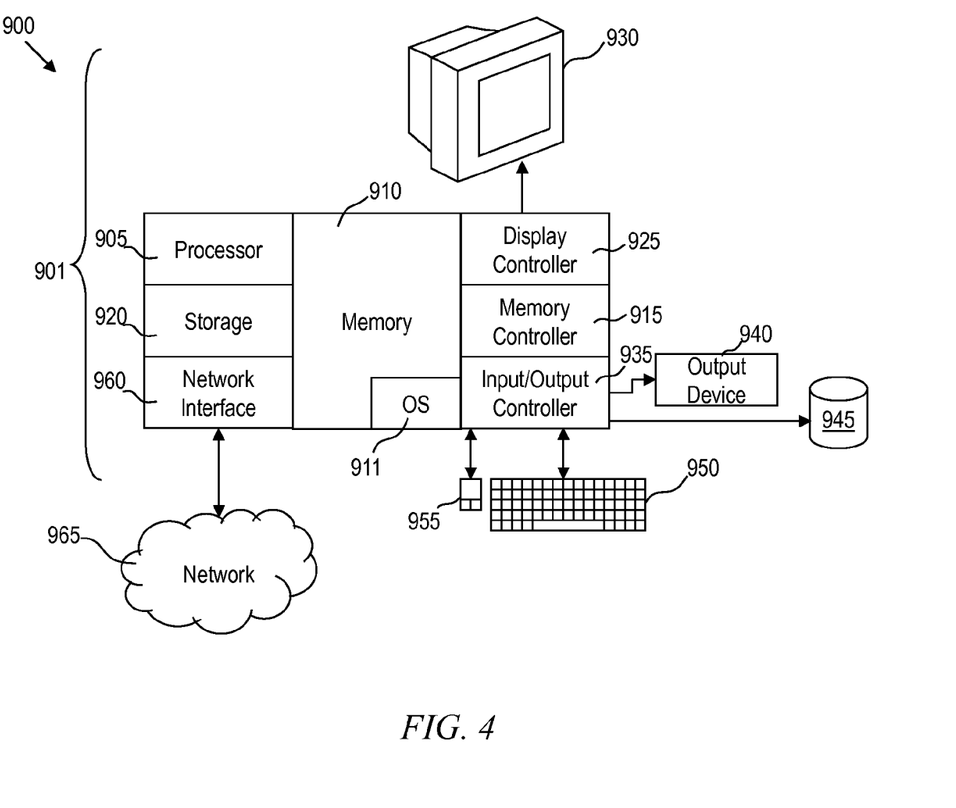
FIG. 4 shows a schematic block diagram of an embodiment of a system adapted for performing the method for reconfigurable power conversion.

FIG. 4 shows a schematic block diagram of an embodiment of a system 900 adapted for executing the method for operating a device 10 for reconfigurable power conversion.

Computerized devices may be suitably designed for implementing embodiments of the present invention as described herein. In that respect, it may be appreciated that the methods described herein are largely non-interactive and automated. In exemplary embodiments, the methods described herein may be implemented either in an interactive, partly-interactive or non-interactive system. The methods described herein may be implemented in software (e.g., firmware), hardware, or a combination thereof. In exemplary embodiments, the methods described herein are implemented in software, as an executable program, the latter executed by suitable digital processing devices. In further exemplary embodiments, at least one step or all steps of above method of FIG. 3 may be implemented in software, as an executable program, the latter executed by suitable digital processing devices. More generally, embodiments of the present invention may be implemented wherein general-purpose digital computers, such as personal computers, workstations, etc., are used.

For instance, the system 900 depicted in FIG. 4 schematically represents a computerized unit 901, e.g., a general-purpose computer. In exemplary embodiments, in terms of hardware architecture, as shown in FIG. 4, the unit 901 includes a processor 905, memory 910 coupled to a memory controller 915, and one or more input and/or output (I/O) devices 940, 945, 950, 955 (or peripherals) that are communicatively coupled via a local input/output controller 935. Further, the input/output controller 935 may be, but is not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 905 is a hardware device for executing software, particularly that stored in memory 910. The processor 905 may be any custom made or commercially available processor, a central processing unit (CPU), an auxiliary processor among several processors associated with the computer 901, a semiconductor based microprocessor (in the form of a microchip or chip set), or generally any device for executing software instructions.

The memory 910 may include any one or combination of volatile memory elements (e.g., random access memory) and nonvolatile memory elements. Moreover, the memory 910 may incorporate electronic, magnetic, optical, and/or other types of storage media. Note that the memory 910 may have a distributed architecture, where various components are situated remote from one another, but may be accessed by the processor 905.

The software in memory 910 may include one or more separate programs, each of which comprises an ordered listing of executable instructions for implementing logical functions. In the example of FIG. 4, the software in the memory 910 includes methods described herein in accordance with exemplary embodiments and a suitable operating system (OS) 911. The OS 911 essentially controls the execution of other computer programs, such as the methods as described herein (e.g., FIG. 3), and provides scheduling, input-output control, file and data management, memory management, and communication control and related services. For example, the interface 1 may be embodied in the OS 911.

The methods described herein may be in the form of a source program, executable program (object code), script, or any other entity comprising a set of instructions to be performed. When in a source program form, then the program needs to be translated via a compiler, assembler, interpreter, or the like, as known per se, which may or may not be included within the memory 910, so as to operate properly in connection with the OS 911. Furthermore, the methods may be written as an object oriented programming language, which has classes of data and methods, or a procedure programming language, which has routines, subroutines, and/or functions.

Possibly, a conventional keyboard 950 and mouse 955 may be coupled to the input/output controller 935. Other I/O devices 940-955 may include sensors (especially in the case of network elements), i.e., hardware devices that produce a measurable response to a change in a physical condition like temperature or pressure (physical data to be monitored). Typically, the analog signal produced by the sensors is digitized by an analog-to-digital converter and sent to controllers 935 for further processing. Sensor nodes are ideally small, consume low energy, are autonomous and operate unattended.

In addition, the I/O devices 940-955 may further include devices that communicate both inputs and outputs. The system 900 may further include a display controller 925 coupled to a display 930. In exemplary embodiments, the system 900 may further include a network interface or transceiver 960 for coupling to a network 965.

The network 965 transmits and receives data between the unit 901 and external systems. The network 965 is possibly implemented in a wireless fashion, e.g., using wireless protocols and technologies, such as WiFi, WiMax, etc. The network 965 may be a fixed wireless network, a wireless local area network (LAN), a wireless wide area network (WAN) a personal area network (PAN), a virtual private network (VPN), intranet or other suitable network system and includes equipment for receiving and transmitting signals.

The network 965 may also be an IP-based network for communication between the unit 901 and any external server, client and the like via a broadband connection. In exemplary embodiments, network 965 may be a managed IP network administered by a service provider. Besides, the network 965 may be a packet-switched network such as a LAN, WAN, Internet network, etc.

If the unit 901 is a PC, workstation, intelligent device or the like, the software in the memory 910 may further include a basic input output system (BIOS). The BIOS is stored in ROM so that the BIOS may be executed when the computer 901 is activated.

When the unit 901 is in operation, the processor 905 is configured to execute software stored within the memory 910, to communicate data to and from the memory 910, and to generally control operations of the computer 901 pursuant to the software. The methods described herein and the OS 911, in whole or in part are read by the processor 905, typically buffered within the processor 905, and then executed. When the methods described herein (e.g. with reference to FIG. 3) are implemented in software, the methods may be stored on any computer readable medium, such as storage 920, for use by or in connection with any computer related system or method.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More generally, while the present invention has been described with reference to certain embodiments, it will be understood by those skilled in the art that various changes may be made and equivalents may be substituted without departing from the scope of the present invention. In addition, many modifications may be made to adapt a particular situation to the teachings of the present invention without departing from its scope. Therefore, it is intended that the present invention not be limited to the particular embodiments disclosed, but that the present invention will include all embodiments falling within the scope of the appended claims.

REFERENCE NUMERALS 10 device
11 power-consuming module
12 power converter module
13 power stage
14 power output
15 backplane
16 power rail
17 programmable converter controller
18 electrical connector
101, 102 method step
900 system
901 computerized unit
905 processor
910 memory
911 operating system (OS)
915 memory controller
920 storage
925 display controller
940 display
945, 950, 955 input and/or output (I/O) devices
935 local input/output controller
950 keyboard
955 mouse
960 network interface or transceiver
965 network

What is claimed is:
1. A device for reconfigurable power conversion, the device comprising:
 a plurality of power-consuming modules being adapted to receive a plurality of electrical voltages,
 a power converter module including a plurality N of power stages, wherein each of the plurality of power stages includes a power output which is adapted to supply one of the plurality of electrical voltages and adapted to be coupled with at least one of the others of the power outputs off the power converter module, and a backplane including a plurality N of power rails, wherein each of the plurality of power rails is connected to the power output of one of the plurality of power stages and each of the plurality of power stages is connected to one of the plurality of power rails, wherein each of the plurality of power rails is adapted to distribute one of the plurality of electrical voltages from the power converter module to the plurality of power-consuming modules, wherein the power converter module further includes a programmable converter controller which is adapted to reversibly configure those of the plurality of power stages having coupled power outputs to supply a common electrical voltage of the plurality of electrical voltages at the coupled power outputs and to reversibly configure each of the plurality of power stages having un-coupled power outputs to supply one of the plurality of electrical voltages at its un-coupled power output, wherein the backplane includes a plurality of electrical connectors, each of the plurality of electrical connectors is adapted to provide a plurality of electrical connections to the plurality of power rails, and the plurality of electrical connectors have a unified pinout.

2. The device of claim 1,
wherein the power converter module is connected to the backplane via one of the plurality of electrical connectors.

3. The device of claim 2,
wherein each of the plurality of power-consuming modules is connected to the backplane via one of the others of the plurality of electrical connectors.

4. The device of claim 1,
wherein each of the plurality of power-consuming modules is connected to at least one of the plurality of power rails.

5. The device of claim 1,
wherein a set of M power outputs of the plurality N of the power outputs are coupled within the backplane, with 2<M≤N, and
wherein those of the plurality of power rails are coupled to which the set of M power outputs are connected.

6. The device of claim 1,
wherein a set of M power outputs of the plurality N of the power outputs are coupled within at least one of the plurality of electrical connectors, with 2<M≤N, and
wherein those of the plurality of electrical connections are coupled to which the set of M power outputs are connected.

7. The device of claim 1,
wherein a set of M power outputs of the plurality N of the power outputs are coupled within at least one of the plurality of power-consuming modules, and
wherein endpoints of those of the plurality of electrical connections are coupled to which the set of M power outputs are connected.

8. The device of claim 1,
wherein the programmable converter controller is adapted to reversibly configure those of the plurality of power stages having coupled power outputs to supply the common electrical voltage of the plurality of electrical voltages at the coupled power outputs based on a first information identifying those power stages having coupled power outputs.

9. The device of claim 1,
wherein the programmable converter controller is adapted to reversibly configure those of the plurality of power stages having coupled power outputs to intermittently supply the common electrical voltage of the plurality of electrical voltages at the coupled power outputs based on the first information identifying those power stages having coupled power outputs.

10. The device of claim 1,
wherein the programmable converter controller is adapted to reversibly configure each of the plurality of power stages having un-coupled power outputs to supply one of the plurality of electrical voltages at its un-coupled power output, based on a second information identifying those power stages having un-coupled power outputs.

11. The device of claim 1,
wherein the programmable converter controller is further adapted to control a plurality of electrical currents at the power outputs of the plurality N of power stages based on measured values of the electrical voltages at the power outputs of the plurality of power stages.

* * * * *